United States Patent
Eldridge et al.

(10) Patent No.: US 8,433,694 B1
(45) Date of Patent: Apr. 30, 2013

(54) FILE CACHE OPTIMIZATION USING ELEMENT DE-PRIORITIZATION

(75) Inventors: Colin Peter Eldridge, Wing (GB); Avinash Ramesh Patil, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 123 days.

(21) Appl. No.: 13/018,081

(22) Filed: Jan. 31, 2011

(51) Int. Cl.
*G06F 17/30* (2006.01)

(52) U.S. Cl.
USPC ......................................................... 707/705

(58) Field of Classification Search .............. 707/4, 651, 707/791, 705; 709/223
See application file for complete search history.

(56) References Cited

U.S. PATENT DOCUMENTS

| | | | |
|---|---|---|---|
| 7,430,640 B2 | 9/2008 | Schmuck et al. | |
| 7,769,719 B2* | 8/2010 | Everhart | 707/651 |
| 7,797,275 B2 | 9/2010 | Lee et al. | |
| 8,086,638 B1* | 12/2011 | Stacey et al. | 707/791 |
| 2006/0218135 A1* | 9/2006 | Bisson et al. | 707/4 |
| 2008/0320052 A1 | 12/2008 | Chandrachari et al. | |
| 2011/0016085 A1 | 1/2011 | Kuo et al. | |

OTHER PUBLICATIONS

Tigran Aivazian, "Linux Kernel 2.4 Internals," Chapter 3: Virtual Filesystem (VFS), Aug. 7, 2002, http://tldp.org/LDP/lki/lki-3.html, 15 pages. (Retrieved May 31, 2011).

* cited by examiner

*Primary Examiner* — Etienne Leroux
(74) *Attorney, Agent, or Firm* — Meyertons, Hood, Kivlin, Kowert & Goetzel, P.C.; Dean M. Munyon; Paul T. Seegers

(57) ABSTRACT

A medium, system, and method are disclosed for implementing an in-memory inode cache. The cache stores inodes that include respective file metadata. The system includes a replacement module that prioritizes the inodes for replacement according to retention priorities for the inodes. The system also includes a prioritization module that is configured to respond to a file close operation by determining whether the file is unlikely to be reopened. If so, the prioritization module responds by decreasing the respective retention priority of one of the inodes, where the one inode stores file metadata for the closed file.

20 Claims, 9 Drawing Sheets

FILE CACHE OPTIMIZATION USING ELEMENT DE-PRIORITIZATION

BACKGROUND

Computer file systems, which organize stored data into files and directories, often utilize metadata to maintain information about the files and directories. For example, UNIX-style file systems (e.g., UFS, VXFS, EXT, etc.) maintain a respective inode data structure for each file and directory in the system. An inode corresponding to a file or directory typically stores various metadata about that file or directory, such as a unique identifier, a storage location, access rights, owner identifier, creation/access records, and/or other fields. The term file metadata is used herein to refer to such metadata, whether it corresponds to a file, to a directory, and/or to any other file system construct. The term inode is used herein to refer generically to any data structure that stores file metadata, without restriction to any particular internal structure.

Inodes may be stored in persistent storage (e.g., disk) along with file data. To access a file, an operating system (OS) may first locate the file's inode on disk, read the file metadata into memory, and then use the metadata to locate and read the file. However, reading an inode from off-memory storage (e.g., disk) may be relatively slow and therefore, applications that open many files may suffer performance degradation.

To speed access to file metadata, some file systems (e.g., VXFS) maintain an in-memory file metadata cache that stores recently accessed file metadata, such as in an in-memory inode data structure. When the OS later attempts to access the same file, the OS may read the corresponding metadata from the in-memory cache rather than perform a slow access to off-memory storage. Such a cache may be referred to herein as a file metadata cache or inode cache.

Since memory is a limited resource, the inode cache cannot grow indefinitely to store metadata from every file system element that the OS accesses. Instead, the OS may initialize a set of inodes in the inode cache and use those inodes to store accessed file metadata. If the OS needs to store new file metadata into a full cache, the OS may choose a cached inode to "evict" and replace the metadata in the determined inode with the new file metadata. This process may be referred to herein as repurposing or replacing the inode. The OS may choose the particular inode to repurpose according to various replacement policies.

The effectiveness of an inode cache may depend substantially on the effectiveness of its replacement policy. Traditional inode caches utilize a least-recently used (LRU) replacement policy, whereby the least-recently accessed inode in cache is first to be repurposed. Some techniques, such as those used in set-associative inode caches, may vary the LRU technique somewhat by mapping the inserting metadata into a given set of inodes and repurposing the least-recently used inode in that set. However, such set-associative techniques maintain the same basic LRU character as fully associative techniques that do not utilize sets.

Although LRU replacement policies may perform reasonably in many situations, the policy is sometimes suboptimal. An inode cache operating according to a suboptimal replacement policy may confer only limited benefit. Furthermore, because systems incur overhead when repurposing inodes, an inode cache with a poor replacement policy may even harm overall system performance in degenerate cases.

SUMMARY OF EMBODIMENTS

A medium, system, and method are disclosed for implementing an in-memory inode cache. The cache stores inodes that include respective file metadata. The system includes a replacement module that prioritizes the inodes for replacement according to retention priorities for the inodes. The system also includes a prioritization module that is configured to respond to a file close operation by determining whether the file is unlikely to be reopened. If so, the prioritization module responds by decreasing the respective retention priority of one of the inodes, where the one inode stores file metadata for the closed file. In various embodiments, the prioritization module may correspond to an operating system module or driver.

In some embodiments, determining that the file is unlikely to be reopened comprises determining that the file was accessed by a low-reuse process, such as a sweep operation. In some embodiments, determining that the file was accessed by a low-reuse process may comprise determining that the file was accessed according to an access pattern consistent with the low-reuse process. In some embodiments, the access pattern may include: opening the file, then reading sequentially from start to finish without modifying the file, and then closing the file.

In some embodiments, determining that the file was accessed by a low-reuse process further comprises determining that a low-reuse process is executing. Determining that a low-reuse process is executing may include determining that a plurality of previously closed files were also accessed according to the access pattern consistent with the low-reuse process.

In some embodiments, determining that a low-reuse process is executing may comprise determining that a global counter is above a given threshold. In such embodiments, the prioritization module may be further configured to increment the counter in response to determining that a closed file was accessed according to the pattern, and to decrement the counter in response to determining that the closed file was not accessed according to the pattern. In some embodiments, the prioritization module may be configured to determine that a value of the global counter is equal to a predefined trigger point, and in response, to modify the value of the global counter to a predefined amount.

In some embodiments, decreasing the respective retention priority of the inode comprises assigning the inode a retention priority lower than that of another one of the inodes, wherein the inode was accessed more recently than the other one of the inodes.

DETAILED DESCRIPTION

Figure 1:
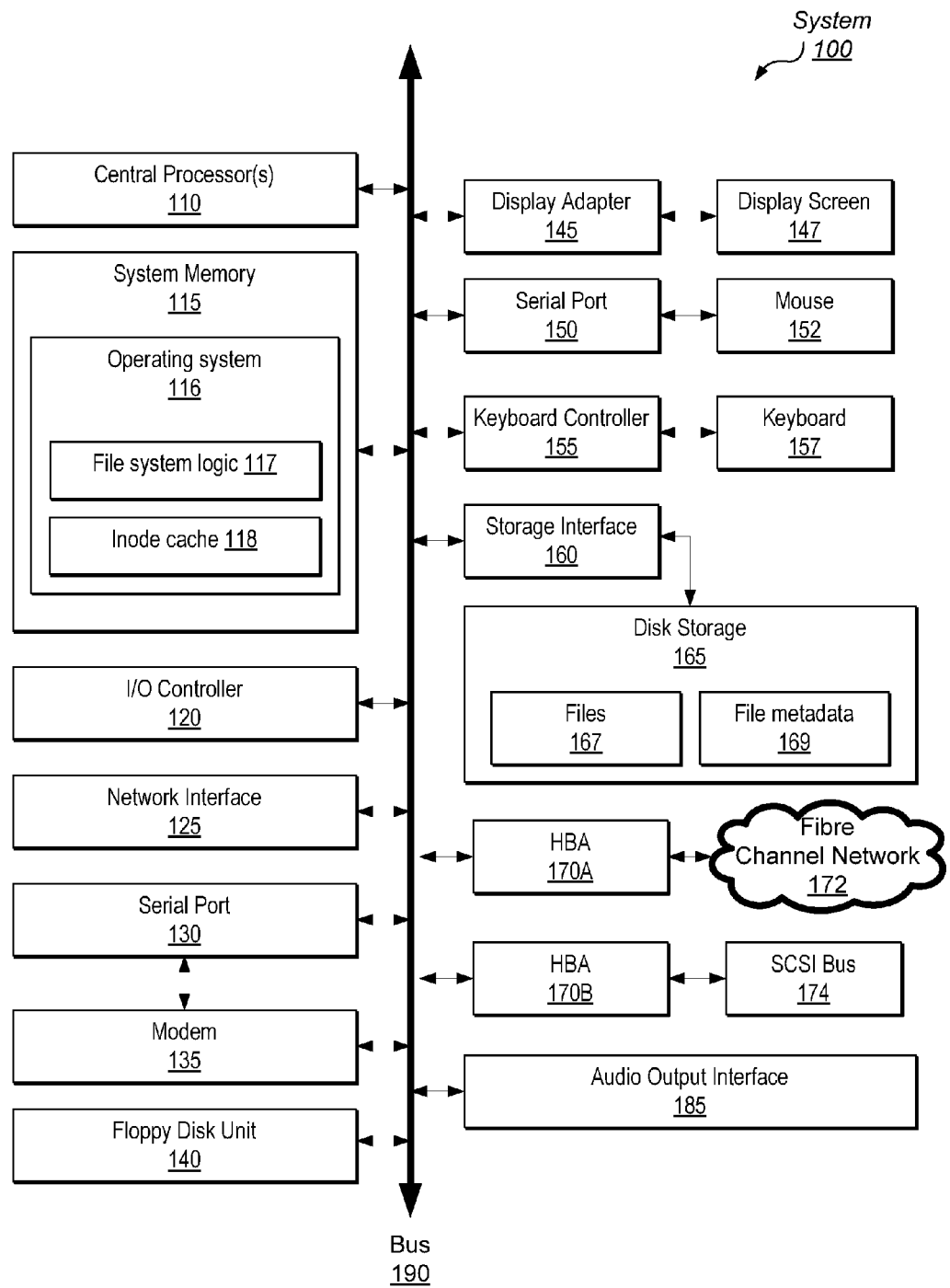
FIG. 1 is a block diagram of a computer system 100 suitable for implementing an inode cache configured for implementing intelligent inode replacement policies, according to some embodiments.

FIG. 1 is a block diagram of a computer system 100 suitable for implementing an inode cache configured for implementing intelligent inode replacement policies, according to some embodiments. Computer system 100 includes a bus 190 which interconnects major subsystems of computer system 100, such as a central processor 110, a system memory 115 (typically RAM, but which may also include ROM, flash RAM, or the like), an input/output controller 120, an external audio device, such as a speaker system via an audio output interface 185, an external device, such as a display screen 147 via display adapter 145, serial ports 130 and 150, a keyboard 157 (interfaced with a keyboard controller 155), a storage interface 160, a floppy disk drive 140 operative to receive a floppy disk, a host bus adapter (HBA) interface card 170A operative to connect with a Fibre Channel network 172, a host bus adapter (HBA) interface card 170B operative to connect to a SCSI bus 174, and an optical disk drive 180 operative to receive an optical disk. The illustrated embodiment may also include a mouse 152 (or other point-and-click device, coupled to bus 190 via serial port 150), a modem 135 (coupled to bus 190 via serial port 130), and a network interface 115 (coupled directly to bus 190).

In some embodiments, bus 190 may allow data communication between central processor 110 and system memory 115, which may include read-only memory (ROM) or flash memory and/or random access memory (RAM). The RAM may be the main memory into which the operating system and application programs are loaded. The ROM or flash memory can contain, among other code, the Basic Input-Output system (BIOS), which controls basic hardware operation such as the interaction with peripheral components.

Storage interface 160, as with the other storage interfaces of computer system 100, can connect to a standard computer readable medium for storage and/or retrieval of information, such as a disk drive 165. Disk drive 165 may be a part of computer system 100 or may be separate and accessed through other interface systems.

Applications and/or data resident on computer system 100 may be stored on and accessed via a computer readable medium, such as a disk drive 165, an optical drive, a floppy disk unit 140, or other storage medium. (As used herein, the phrase "storage medium" refers to a tangible and non-transitory medium, and excludes, for example, signals.) Various ones of these storage facilities may be used to store file system data, such as files 167 and file metadata 169. In some embodiments, file metadata 169 may include metadata stored in inodes, which correspond to respective one of files 167, directories, and/or other file system elements.

In some embodiments, stored data may be in the form of electronic signals modulated in accordance with the application and data communication technology when accessed via network modem 135 or interface 115.

Modem 135 may provide a direct connection to a remote server via a telephone link or to the Internet via an internet service provider (ISP). Network interface 160 may provide a direct connection to a remote server via a direct network link to the Internet via a POP (point of presence). Network interface 125 may provide such connection using wireless techniques, including digital cellular telephone connection, Cellular Digital Packet Data (CDPD) connection, digital satellite data connection or the like.

Various other devices or subsystems (not shown) may be connected in a similar manner (e.g., document scanners, digital cameras and so on). Conversely, all of the devices shown in FIG. 1 need not be present to practice the present disclosure. The devices and subsystems can be interconnected in different ways from that shown in FIG. 1. The operation of a computer system such as that shown in FIG. 1 is readily known in the art and is not discussed in detail in this application.

Code to implement various aspects of the present disclosure can be stored in computer-readable storage media such as one or more of system memory 115, disk 165, optical disk 180, or floppy disk read by floppy disk unit 140. For example, system memory 115 may include operating system 116 (e.g., UNIX, MS-DOS®, MS-WINDOWS®, OS/1®, UNIX®, Linux®, or another operating system).

In some embodiments, operating system 116 includes file system logic 117 to implement a file system useful for managing and/or organizing stored data, such as files 167 on disk storage 165. Operating system 116 also includes inode cache 118. In some embodiments, inode cache 118 may include various management policies, such as replacement policies, policies defining when to grow or shrink the cache, and/or other management policies. Such policies may be configured to implement early eviction and/or delayed eviction mechanisms as described herein.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above-described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 2:
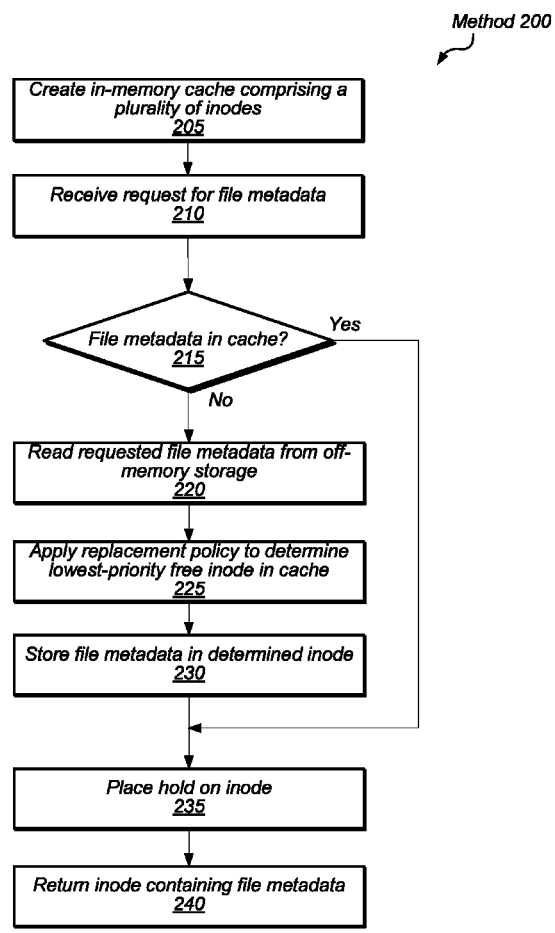
FIG. 2 is a flow diagram illustrating a method for utilizing an inode cache, according to some embodiments.

FIG. 2 is a flow diagram illustrating a method for utilizing an inode cache, according to some embodiments. Method 200 may be executed by a file system (e.g., file system logic 117), a subcomponent of a file system, and/or another operating system component.

According to the illustrated embodiment, method 200 begins by creating an in-memory cache comprising a plurality of inodes, as in 205. Each inode may be a data structure configured to store file metadata for a respective file, directory, or other file system entity. The inode cache may also comprise various other data structures and/or logic to facilitate caching of file metadata in the inode cache.

The file system may use the inode cache created in 205 to service various requests for file metadata. The file system may receive such requests from applications and/or from components of the file system itself. For example, in response to an application requesting file data through a file system API, a first component of the file system may issue a request to a second component for file metadata (e.g., inode) corresponding to the file.

In 210, the file system receives a request for file metadata and in response, may query the cache to determine whether the cache already contains that metadata, as in 215. If the cache contains the metadata (i.e., cache hit), as indicated by the affirmative exit from 215, the file system may place a hold on the cached inode that stores the file metadata (as in 235) and return it (as in 240). In some embodiments, the system may place a separate hold for each user program or other object that replies on the inode (e.g., has been granted a handle on the corresponding file). In some embodiments, an inode with a hold may not be repurposed.

According to the illustrated embodiment, if the file metadata is not resident in the inode cache (i.e., cache miss as indicated by the negative exit from 215) the file system must retrieve the requested file metadata from off-memory storage, such as disk (as in 220). For example, reading the file metadata may comprise locating an on-disk inode data structure corresponding to a given file and reading the file's metadata from the inode.

After reading the file metadata in 220, the file system may cache the metadata in the inode cache. To cache the metadata, the file system may first identify an in-memory inode to repurpose or replace. Replacement/repurposing of a node refers to changing an inode cache entry from referring to a first inode (the previous entry) to referring to a second inode (the new entry). Replacement may not involve a new allocation of memory, but may instead use memory previously allocated to an old inode for storing a new inode. For example, in 225, the file system may apply a replacement policy to determine respective retention priorities for the cached inodes and to identify the lowest-priority (as determined by priority criteria) free inode in the cache. An inode is said to be free if it is not relied upon or used by an open file or directory. In some embodiments, only free inodes may be repurposed.

In 230, the file system repurposes the determined inode to store the retrieved metadata. The file system then places a hold on the repurposed inode, as in 235, to indicate that the inode is no longer free. In 240, the file system returns the inode or its metadata to the requesting component.

Traditional file systems implement relatively simple retention-priority schemes, such as LRU. Such an inode cache maintains an LRU-ordered list of inodes, where the inode at the head of the list was least-recently used and therefore has the lowest retention-priority (i.e., is first to be repurposed). When an inode is accessed, the traditional system updates the inode's retention priority by moving the inode to the tail of the list (MRU position) such that it is last in line to be repurposed. However, such a simple priority-update mechanism is not always optimal.

According to various embodiments, a file system may implement a more sophisticated prioritization scheme by updating respective retention priorities of cached inodes in response to different cache events. By prioritizing and/or de-prioritizing cached inodes in a more intelligent manner than do traditional LRU schemes, a file system may implement a more effective replacement policy and achieve higher inode-cache hit rates.

Figure 3A:
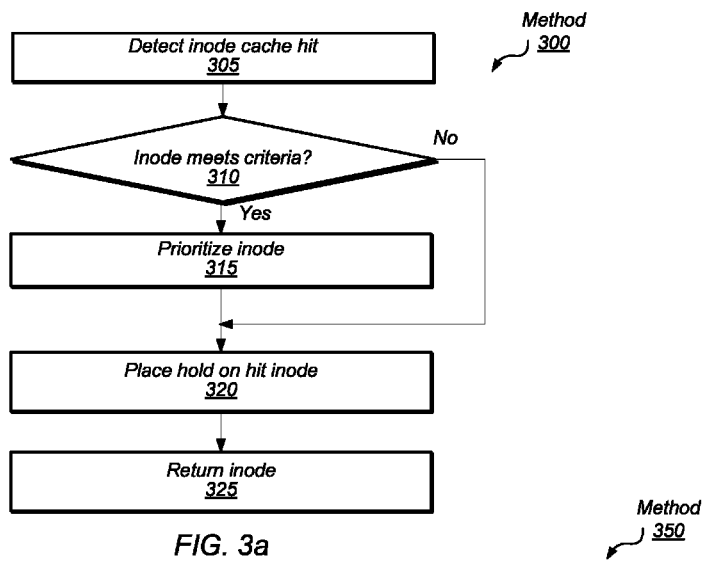
FIG. 3a is a flow diagram illustrating a method for increasing retention priority of an inode in response to detecting a cache hit on the inode and that the inode meets one or more given criteria, according to some embodiments.
Figure 3B:
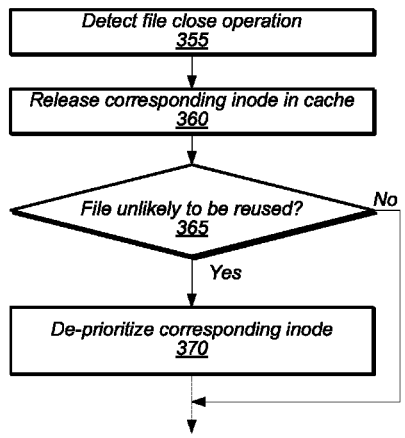
FIG. 3b is a flow diagram illustrating a method for decreasing retention priority of an inode in response to releasing the inode and detecting that the metadata in the released inode is unlikely to be reused, according to some embodiments.

FIGS. 3*a* and 3*b* are flow diagrams illustrating respective methods for increasing and decreasing retention priorities for inodes in response to various inode cache events. Each method may be performed by an inode cache, file system, and/or another component of an operating system, according to various embodiments.

FIG. 3*a* is a flow diagram illustrating a method for increasing retention priority of an inode in response to detecting a cache hit on the inode and that the inode meets one or more given criteria, according to some embodiments.

According to the illustrated embodiment, method 300 begins when the system detects a hit on an inode in an inode cache, as in 305. For example, if a user program attempts to open a file through a file system API, the system may query the inode cache for the metadata corresponding to that file. If an inode in the cache contains the metadata, the query results in a cache hit on the inode, as in 305.

In response to the cache hit, the system may examine the hit inode to determine if it meets one or more criteria, as in 310. In some embodiments, the criteria may include that the inode is free (i.e., no user program has a hold on the inode). The criteria may differ across different embodiments and may be referred to herein as longevity criteria.

In method 300, if the inode does not meet the one or more longevity criteria, as indicated by the negative exit from 310, the inode cache places a hold on the inode (as in 320) and returns the inode to the requesting entity (as in 325) as normal. However, if the inode does meet the longevity criteria (as indicated by the affirmative exit from 310), the system prioritizes the inode in 315 (i.e., increases the inode's retention priority). The system then places a hold on the inode (320) and returns it (325) to the requesting entity. Thus, an inode that meets the longevity criteria in 310 may have a higher retention priority at 325 than it would have had if it did not meet the criteria.

FIG. 3*b* is a flow diagram illustrating a method for decreasing retention priority of an inode in response to releasing the inode and detecting that the metadata in the released inode is unlikely to be reused, according to some embodiments.

According to the illustrated embodiment, method 350 begins when the system detects a file close operation in 355. For example, the system may detect a file close operation in response to a user program closing a file through a file system API call.

In 360, the file system releases the inode corresponding to the closed file. Releasing the corresponding inode may include locating the inode (in cache) that corresponds to the closed file, removing a hold associated with the user program from the inode, and if no user program has a hold on the inode, indicating that the inode is free, such as by adding it to a free list.

In 365, the system determines whether the file is unlikely to be reused. For example, in 365, the system may determine whether the closed file was accessed according to an access pattern indicative of a low-reuse process that does not generally reopen files. As used herein, the term low-reuse process refers to a process that does not typically reopen files after closing. Examples of low-reuse processes include sweep operations, which sweep through an entire directory or file system, reading each file only once (e.g., backup operations, virus scans, etc.), and random-access operations, which poll files in the system and do not return to polled files.

According to the illustrated embodiment, if the system determines that the file is unlikely to be reused (as indicated by the affirmative exit from 365), the system may de-prioritize the corresponding inode (i.e., decrease its retention priority), as in 370. Otherwise, if the system does not determine that the file is unlikely to be reused (e.g., file was not accessed according to a lower reuse pattern), the system may skip the de-prioritization step, as indicated by the negative exit from 365.

Figure 4:
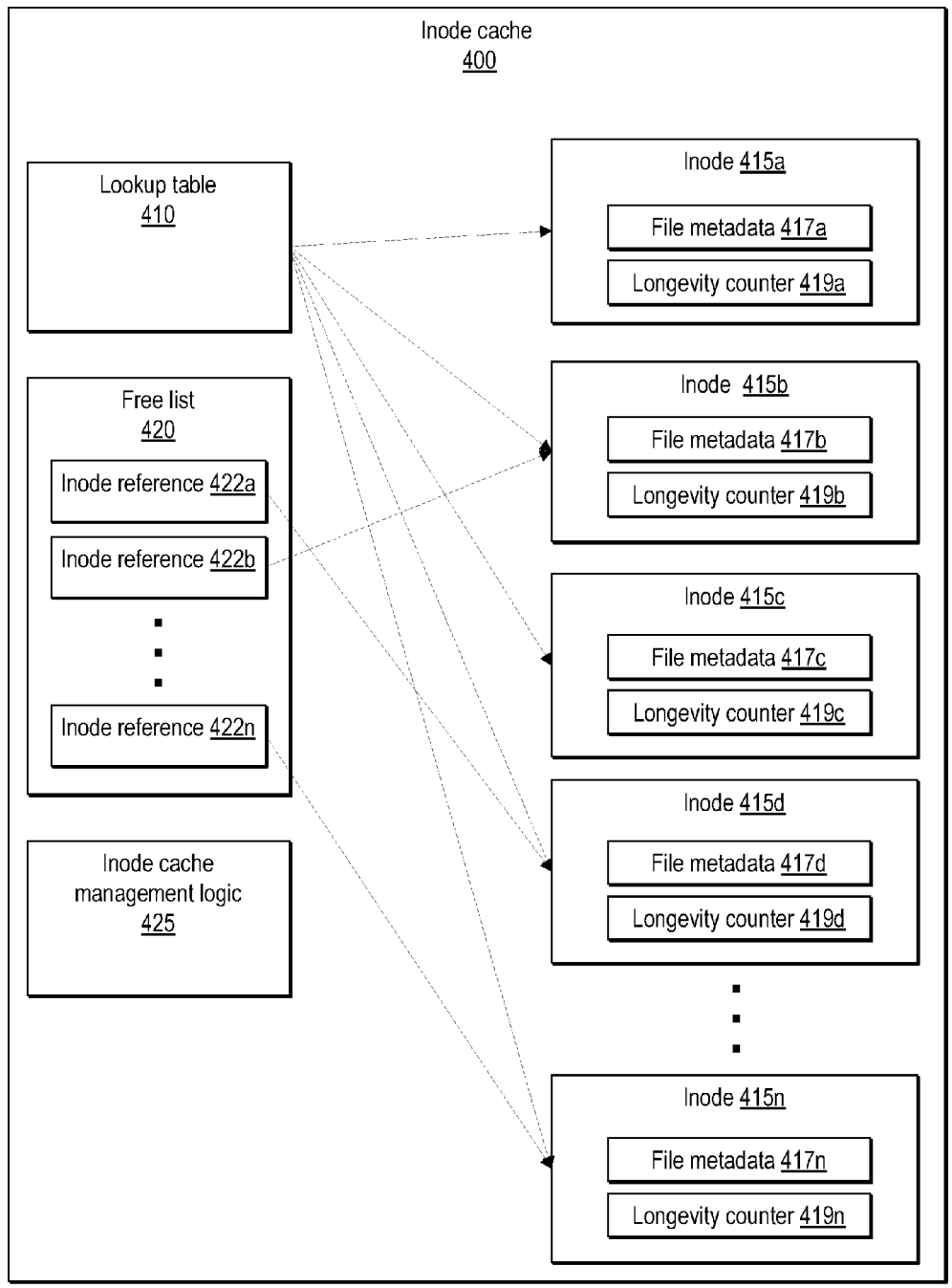
FIG. 4 is a block diagram illustrating an inode cache configured to perform intelligent inode retention prioritization and de-prioritization, according to various embodiments.

FIG. 4 is a block diagram illustrating an inode cache configured to perform intelligent inode retention prioritization and de-prioritization, according to various embodiments. In various embodiments, an inode cache may include fewer or additional components and various components may be combined or separated further.

In the illustrated embodiment, inode cache 400 includes various inode data structures (inodes 415a-415n), each of which contains respective file metadata (417a-417n) corresponding to different file and/or directories in the file system. Each of inodes 415 may include (or be otherwise associated with) a respective longevity counter, such as 419a-419n. The longevity counters 419 may be used to augment retention priorities as discussed in more detail below.

According to the illustrated embodiment, inode cache 400 includes a lookup table 410, which may be usable to locate inodes storing given metadata. For example, lookup table 410 may be implemented as a hash table that maps a unique file identifier (or other unique metadata for a given file) to the one of inodes 415 that stores that file's metadata. Therefore, when the file system requires file metadata for a given file, it may query lookup table 410 using the file's unique identifier. If lookup table 410 contains a mapping to one of inodes 415, the query results in a cache hit, and the inode cache can return the corresponding inode. However, if the lookup table does not contain a mapping to one of inodes 415, the query results in a cache miss, and the file system may need to retrieve and read the inode from disk.

In the illustrated embodiment, inode cache 400 includes a free list 420 for tracking those of inodes 415 that are free (i.e., have no holds). In some embodiments, free list 420 may include a reference to each free one of inodes 415, such as inode references 422a-422n.

In the illustrated embodiment, inode cache 400 includes management logic 425, which may be configured to perform various functions. In some embodiments, management logic 425 may be configured to query lookup table 410 to determine which (if any) of inodes 415 holds metadata for a given file. Management logic 425 may also be configured to respond to cache misses by determining a lowest-priority one of the inodes referenced by free list 420 and to repurpose that inode. Management logic 425 may also be configured to maintain and/or update retention priorities for the inodes referenced by free list 420. For example, the management logic may update the retention priorities in response to various inode cache events, as described herein.

Figure 5:
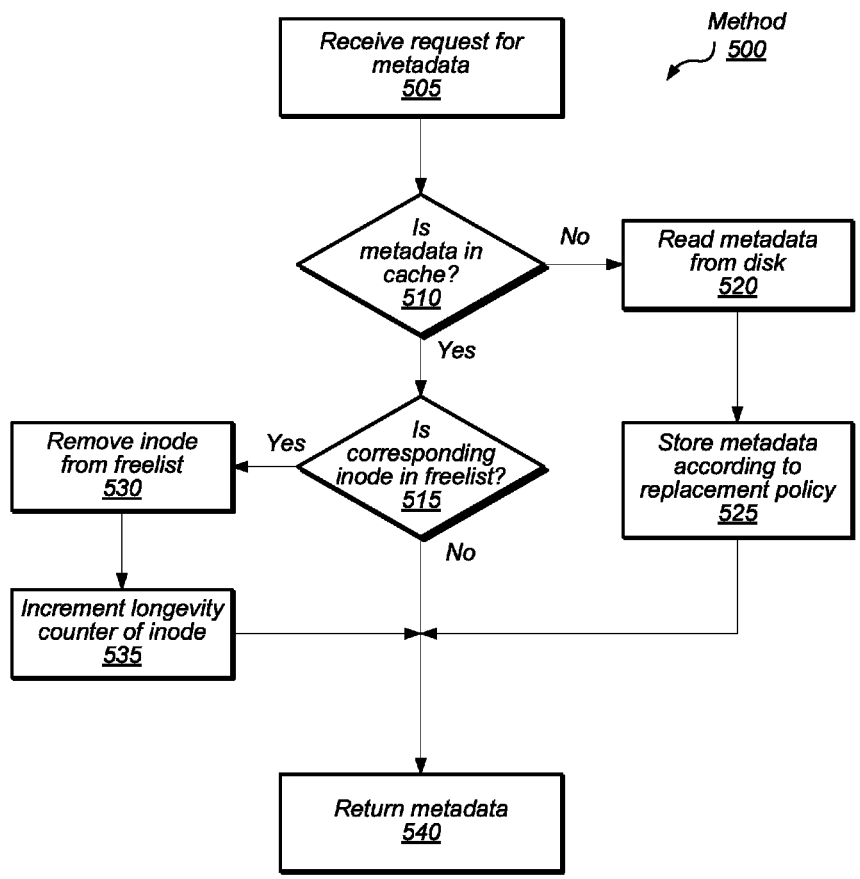
FIG. 5 is a flow diagram illustrating a method for increasing the retention priority of an inode in response to detecting a cache hit on the inode and that the inode is free, according to some embodiments.

FIG. 5 is a flow diagram illustrating a method for increasing the retention priority of an inode in response to detecting a cache hit on the inode and that the inode is free, according to some embodiments. Method 500 may be executed by management logic 425 and correspond to one or more implementations of method 300 in FIG. 3a.

According to the illustrated embodiment, method 500 begins when the management logic receives a request for an inode, as in 505. The request may include a query comprising a unique file identifier.

In 510, the management logic may determine whether the requested metadata is in the cache. For example, the management logic may query lookup table 410 to determine if a mapping exists from the given unique file identifier a cached inode 415 that stores the file metadata for that file.

If the requested metadata is not in the cache (i.e., cache miss, as indicated by the negative exit from 510) the system may read the metadata from disk, as in 520. For example, the system may locate and read the on-disk inode corresponding to the requested file.

Figure 6:
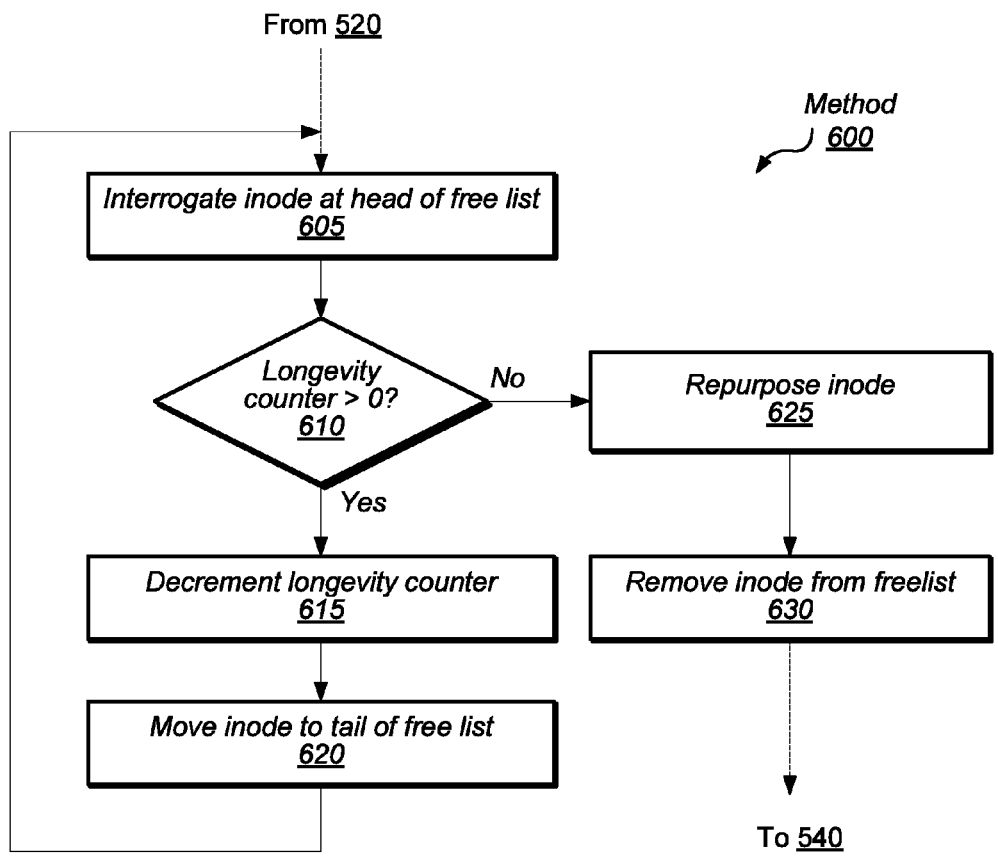
FIG. 6 is a flow diagram illustrating a method for storing metadata in a cache according to a replacement policy that utilizes longevity counters, according to some embodiments.

In 525, the management logic inserts the newly read metadata into the cache according to the particular replacement policy implemented by the management logic. For example, management logic 425 may determine the lowest-priority inode on free list 420 and repurpose that inode by replacing its metadata with the newly read metadata. FIG. 6 illustrates a detailed method for inserting the newly read metadata, according to some embodiments. The cache may then return the metadata to the requesting entity, as in 540, such as by returning the cached inode.

If the requested metadata is in the cache (a cache hit, as indicated by the affirmative exit from 510), the management logic may determine whether the requested metadata is stored in an inode on the free list, as in 515. For example, in some embodiments, the management logic may examine the free list (or another data structure) to determine if it references an inode containing the corresponding file metadata.

If the inode containing the metadata is not on the free list (as indicated by the negative exit from 515), then there is a hold on the inode and the cache may return the metadata, as in 540. However, if the inode containing the metadata is on the free list (as indicated by the affirmative exit from 515) then there are no holds on the inode and the management logic may remove the inode from the free-list (as in 530). Removing the inode from the free list may include removing the reference to the inode from the free list and/or recording a hold on the inode by the requesting entity (e.g., user application).

In 535, the management logic may increment a longevity counter associated with the inode. For example, in 510, management logic 425 may detect a hit on inode 415b. In 515, management logic 425 may determine that inode 415b is on free list 420 (i.e., referenced by reference 422b). In 530, management logic 425 may remove inode reference 422b from free list 420, and in 535, increment longevity counter 419b of inode 415b. The management logic may then return the metadata to the requesting entity, as in 540. Thus, the management logic increments a cached inode's longevity counter in response to detecting a cache hit on the cached inode and that the cached inode is on the free list.

FIG. 6 is a flow diagram illustrating a method for storing metadata in a cache according to a replacement policy that utilizes longevity counters, according to some embodiments. In some embodiments, method 600 of FIG. 6 may correspond to step 525 of method 500 in FIG. 5. That is, the management logic may execute method 600 to store metadata in a cache according to a replacement policy.

According to the illustrated embodiment, after the management logic reads file metadata from disk in response to a cache miss (as in 520), the logic interrogates the inode at the head of the free list, as in 605. If the longevity counter of that inode is greater than 0 (as indicated by the affirmative exit from 610) the logic decrements the longevity counter (as in 615), and moves the interrogated inode to the tail of the free list (as in 620). As indicated by the feedback loop from 620 to 605, the management logic then interrogates the new head of the free list and repeats until finding an inode whose longevity counter is less than or equal to zero, as indicated by the negative exit from 610.

When the management logic determines that the inode at the head of the free list has a longevity counter value equal to 0 (negative exit from 610), the logic repurposes the inode at the head of the free list, as in 625. Thus, method 600 is less likely to repurpose inodes with high longevity counter values. Such inodes have been repeatedly used and released without repurposing and therefore are more likely to be reused again. As discussed above, repurposing the inode in 625 may include replacing the file metadata stored in the inode with the file metadata read from disk in 520.

After repurposing the inode in 625, the management logic removes the inode from the free list, as in 630. Removing the inode from the free list may include removing a reference to the inode from the free list, associating a hold with the inode indicating that the corresponding file is held open by a given entity (e.g., user program), and/or setting the inode's longevity counter to 0. The inode may not be available for repurposing while it is no longer on the free list. After repurposing the inode, the management logic may return the metadata to the requesting entity, as in 540.

In some embodiments, after the user program closes the file, the management logic may determine that no other entity has a hold on the inode corresponding to that file and in response, insert a reference to the inode at the tail of the free list (i.e., the MRU position in the ordered list). Thus, the longevity counter scheme allows the management logic to increase the retention priority of an inode when it is reused, rather than repurposed, after being released. The scheme therefore allows inodes that are more likely to be reused to remain in the free list longer than a traditional LRU mechanism might keep them.

In various embodiments, method 600 may be optimized to avoid extraneous iterations of the 605-620 loop. For example, when the longevity counters of every inode in the free list is greater than 0, method 600 may perform multiple iterations of 605-620 before finally finding an inode with a longevity counter equal to 0. In some embodiments, the management logic may avoid such an outcome by tracking the lowest longevity counter value of all inodes on the free list and decrementing that amount in step 615.

In some embodiments, in addition and/or instead of increasing the retention priorities of various inodes in response to detecting certain conditions, the management logic may decrease the retention priority of inodes that store metadata unlikely to be reused. For example, the management logic may de-prioritize a released inode in response to detecting that its metadata was accessed as part of a low-reuse file access pattern.

Figure 7:
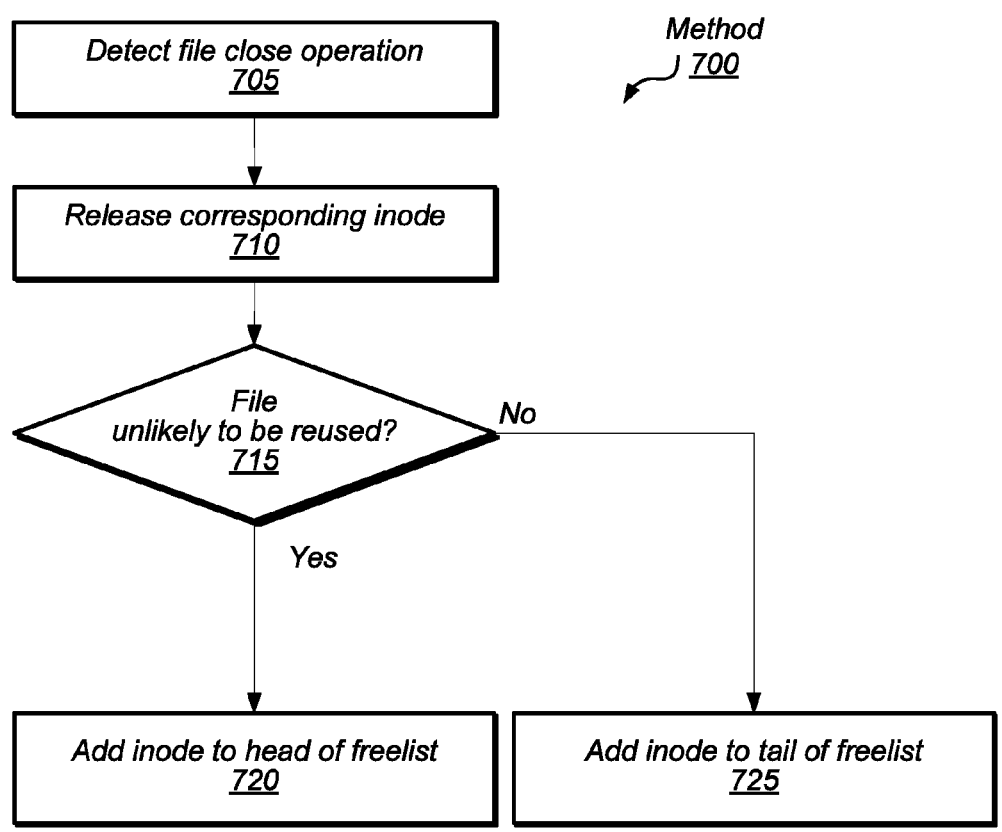
FIG. 7 is a block diagram illustrating a method for decreasing the retention priority of inodes that store file metadata that is unlikely to be reused, according to some embodiments.

FIG. 7 is a block diagram illustrating a method for decreasing the retention priority of inodes that store file metadata that is unlikely to be reused, according to some embodiments. Method 700 may correspond to method 350 in FIG. 3b and may be executed by management logic 425.

According to the illustrated embodiment, method 700 begins when the system detects a file close operation, as in 705. For example, the management logic may detect the file close operation in response to user code invoking a file close function of the file system API.

In response to detecting the file close operation in 705, the management logic may release the corresponding inode that holds the file's metadata, as in 710. Releasing the inode may include removing the hold placed on the inode when the closing program opened the file and/or determining that no other entity has a hold on the inode.

In 715, the management logic determines whether the closed file is unlikely to be reused. For example, the management logic may determine whether the file was read as part of a sweep operation (e.g., a virus scan or backup operation) that reads files only once. If so, then the closed file is unlikely to be reopened.

Caching file metadata for a closed file that is unlikely to be reopened may provide no performance benefit. Therefore, in response to detecting that a released inode holds metadata for such a file, the management logic may de-prioritize the inode by decreasing its retention priority. For example, in the illustrated embodiment, in response to detecting that the file is unlikely to be reused, as indicated by the affirmative exit from 715, the management logic may add the released inode to the head (LRU position) of the free list, as in 720, rather than to the tail (MRU position), as in 725. Thus, a released inode that holds metadata for a file that is unlikely to be reused will be repurposed first In various embodiments, the management logic may employ different techniques in 715 to determine whether the file is unlikely to be reused. In some embodiments, it may be desirable for the management logic to decide transparently whether a file is unlikely to be reused (decision 715), without the need to rely on special user code to identify and mark such files. Accordingly, in some embodiments, the management logic may determine that the file is unlikely to be reused by examining the manner in which the file was accessed (i.e., access pattern). For example, the file system may track how each opened file is accessed, and in 715, the management logic may examine this information (e.g., through an API, directly through in-memory data structures, etc.) to determine if the access pattern to the file closed in 705 is indicative of a low-reuse process, such as a backup process, virus scan, or other sweep operation. If so, then the management logic may determine that the file is unlikely to be reused again (affirmative exit from 715) and may therefore de-prioritize the corresponding inode (e.g., add the inode to the head of the free list, as in 720). Otherwise, the logic may add the released inode to the tail of the free list, as in 725.

In various embodiments, the management logic may use different methods to determine whether an access pattern is indicative of a low-reuse process. For example, in some embodiments, an access pattern consisting of opening a file, reading the file sequentially once from start to finish, and closing the file, all without modifying the file content, may be indicative of a low-reuse process. In different embodiments, the management logic may use different and/or additional criteria to identify access patterns indicative of low-reuse processes.

In some embodiments, the management logic may transparently determine whether a file is unlikely to be reused by examining access patterns of the file and of other files (i.e., multi-file access patterns). By examining file access trends across multiple files, the management logic may be able to identify low-reuse processes dynamically and therefore more accurately identify files, in 715, that are unlikely likely to be reused.

Figure 8:
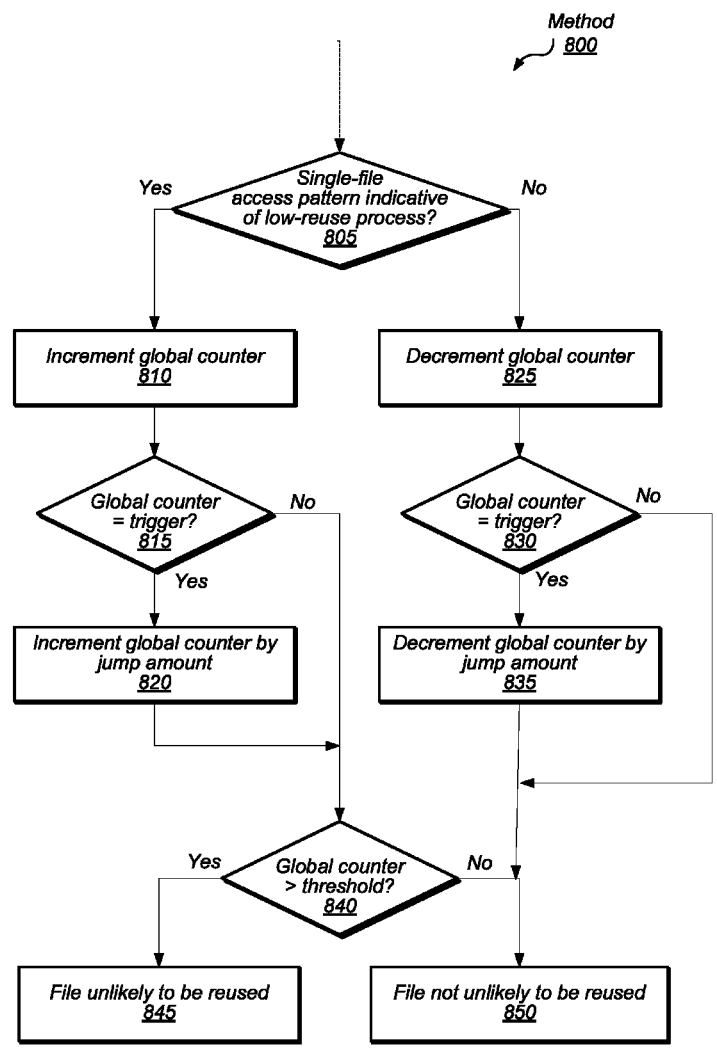
FIG. 8 is a flow diagram illustrating a method for using multi-file access patterns to determine whether a closed file is unlikely to be reused, according to some embodiments.

FIG. 8 is a flow diagram illustrating a method for using multi-file access patterns to determine whether a closed file is unlikely to be reused, according to some embodiments. Method 800 of FIG. 8 may correspond to decision 715 of method 700 in FIG. 7.

In method 800, the management logic maintains a global counter that indicates whether a multi-file access pattern indicative of a low-reuse process has been observed. The method considers the state of the global counter when predicting whether a given closed file will be reused. That is, in method 800, the management logic determines that a file is unlikely to be reused only if both the single-file access pattern (access to that particular file) and the multi-file access pattern (as indicated by the global counter) are indicative of a low-reuse process. The global counter is just one example of a multi-file pattern indicator, and in various embodiments, different and/or additional multi-file pattern detection schemes and indicators may be used.

Method 800 begins after a file is closed. The management logic determines, in 805, whether the single-file access pattern to that file is indicative of a low-reuse process. In some embodiments, the criteria applied in 805 may be static (e.g., the file was opened, read sequentially exactly once from start to finish, and closed, all without modifying the file content) and/or dynamic (e.g., the pattern is similar to other single-file access patterns after which the closed file was not reopened).

According to the illustrated embodiment, if the single-file access pattern is indicative of a low-reuse process (affirmative exit from 805), the management logic increments the global counter, as in 810. Otherwise (negative exit from 805), the management logic decrements the global counter, as in 825. In some embodiments, the counter may have a limited range (e.g., 0-120), such that step 810 never increments the counter above its maximum and step 825 never decrements the counter below its minimum. If the global counter has a value above a given trigger value, the management logic may conclude that a multi-file access pattern indicative of a low-reuse process exists.

According to the illustrated embodiment, if the global counter is equal to the trigger value (as in 815 or 830), the management logic may modify the global counter by a value greater than the typical increment and/or decrement values of 810 and 825. For example, if the global counter has a range of 0-120 and steps 810 and 825 increment and decrement the counter by 1 respectively, the jump amount may be 20. Therefore, if the global counter is incremented in 810 to a value equal to the trigger point (affirmative exit from 815), the management logic increments the counter again in 820, by the jump amount (e.g., 20). Likewise, if the global counter is decremented in 825 to a value equal to the trigger point (affirmative exit from 830), the management logic decrements the counter again by the jump amount (e.g., 20) in 825. By using trigger points and jump amounts, the management logic may avoid thrashing behavior when identifying multi-file patterns.

In the illustrated embodiment, if a file was not accessed according to a single-file access pattern indicative of a low-reuse process (negative exit from 805), then the management logic determines in 850 that the file is not unlikely to be reused. However, if the file was accessed according to a single-file access pattern indicative of a low-reuse process (affirmative exit from 805) and the single-file access pattern is part of a multi-file access pattern indicative of a low-reuse process, the management logic determines in 845 that the file is unlikely to be reused. In the illustrated embodiment, the management logic determines that a multi-file pattern exists if the global counter is above the threshold (affirmative exit from 840). If the global counter is below the threshold (negative exit from 840), then no multi-file pattern has been detected and the management logic does not conclude that the file is unlikely to be reused (850).

Figure 9:
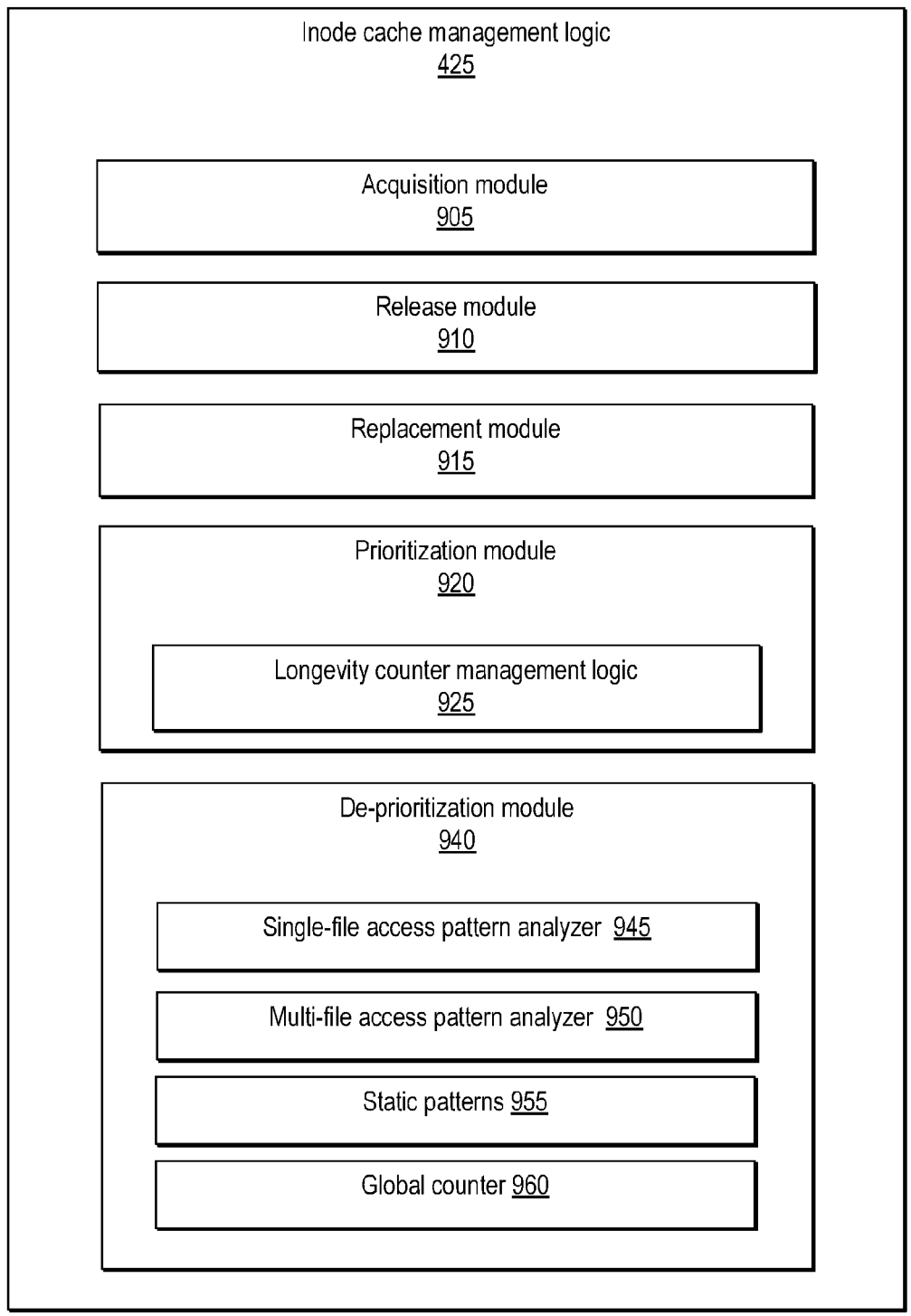
FIG. 9 is a block diagram illustrating the components of inode cache management logic, according to some embodiments.

FIG. 9 is a block diagram illustrating the components of inode cache management logic, according to some embodiments. Inode cache management logic 425 in FIG. 9 may correspond to management logic 425 in FIG. 4.

According to the illustrated embodiment, management logic 425 includes an acquisition module 905 and release module 910. Acquisition module 905 may be configured to locate and return inodes in response to requests (e.g., file open operations), such as by executing steps 210-240 of method 200 in FIG. 2. In response to request, acquisition module 905 may utilize a lookup table (e.g., 410 of FIG. 4) to find an inode containing the metadata in cache, remove the inode from the free list (if it was on the free list), and return the inode or metadata within the inode. If the metadata is not in cache, acquisition module 905 may fetch the metadata from disk. After acquisition module 905 fetches the metadata from disk, replacement module 915 may determine the inode in cache with lowest retention priority and repurpose that inode by storing the newly acquired metadata in it.

In some embodiments, release module 910 may be configured to release inodes in response to requests (e.g., file close operations). Releasing an inode may include releasing holds on the cached inodes and/or placing the inodes into the free list.

Acquisition module 905 and/or release module 910 may make use of prioritization module 920 to increase retention priorities of some inodes and/or of de-prioritization module 940 to decrease retention priorities of some inodes, as described herein. For example, prioritization module 920 may comprise longevity counter management logic 925 for managing longevity counters as described herein with relation to FIGS. 5 and 6. De-prioritization module 940 may be configured to detect single-file and multi-file access patterns that are indicative of low-reuse processes and to de-prioritize inodes storing metadata for files that are unlikely to be reused (e.g., as in FIGS. 7 and 8).

In some embodiments, de-prioritization module 940 may include single-file access pattern analyzer 945 and multi-file access pattern analyzer 950 for detecting single-file and multi-file access patterns indicative of low-reuse processes, as described herein. In some embodiments, analyzers 945 and/or 950 may utilize various static patterns 955 for detecting single-file and/or multi-file patterns. For example, static patterns 955 may include the pattern that a file is opened, read sequentially only once from beginning to end, and then closed without being modified. In some embodiments, multi-file access pattern analyzer 950 may utilize various pattern indicators, such as global counter 960. Analyzer 950 may utilize global counter 960 according to method 800, and/or various other pattern indicators to determine when a low-reuse process is executing.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A computer-readable storage medium storing program instructions executable by a computer system to implement:
   an inode cache within a memory of the computer system, wherein the inode cache stores inodes of a storage device associated with the computer system;
   a replacement module that prioritizes inodes for replacement according to retention priorities for the inodes; and
   a prioritization module configured to respond to a file close operation by determining whether the file is unlikely to be reopened, and in response to determining that the file is unlikely to be reopened, decreasing the respective retention priority of one of the inodes, wherein the one of the inodes stores file metadata for the file.

2. The computer-readable storage medium of claim 1, wherein determining that the file is unlikely to be reopened comprises determining that the file was accessed by a low-reuse process.

3. The computer-readable storage medium of claim 2, wherein determining that the file was accessed by a low-reuse process comprises determining that the file was accessed according to an access pattern consistent with the low-reuse process.

4. The computer-readable storage medium of claim 3, wherein the access pattern comprises: opening the file, then reading sequentially from start to finish without modifying the file, and then closing the file.

5. The computer-readable storage medium of claim 3, wherein determining that the file was accessed by a low-reuse process further comprises determining that a low-reuse process is executing.

6. The computer-readable storage medium of claim 5, wherein determining that a low-reuse process is executing, comprises determining that a plurality of previously closed files were also accessed according to the access pattern consistent with the low-reuse process.

7. The computer-readable storage medium of claim 5, wherein determining that a low-reuse process is executing comprises determining that a global counter is above a given threshold, wherein the prioritization module is configured to:
increment the counter in response to determining that a closed file was accessed according to the pattern; and
decrement the counter in response to determining that the closed file was not accessed according to the pattern.

8. The computer-readable storage medium of claim 7, wherein the prioritization module is further configured to determine that a value of the global counter is equal to a predefined trigger point, and in response, to modify the value of the global counter to a predefined amount.

9. The computer-readable storage medium of claim 2, wherein the low-reuse process corresponds to a sweep operation.

10. The computer-readable storage medium of claim 1, wherein decreasing the respective retention priority of the inode comprises assigning the inode a retention priority lower than that of another one of the inodes, wherein the inode was accessed more recently than the another one of the inodes.

11. The computer-readable storage medium of claim 1, wherein the prioritization module is an operating system module or driver.

12. A system comprising:
a processor;
storage configured to maintain a plurality of inodes;
memory coupled to the processor and storing program instructions executable to implement:
an inode cache within the memory, wherein the inode cache stores ones of the plurality of inodes;
a replacement module that prioritizes inodes for replacement according to retention priorities for the stored inodes; and
a prioritization module configured to respond to a file close operation by determining whether the file is unlikely to be reopened, and in response to determining that the file is unlikely to be reopened, decreasing the respective retention priority of one of the stored inodes, wherein the one of the stored inodes stores file metadata for the file.

13. The system of claim 12, wherein determining that the file is unlikely to be reopened comprises determining that the file was accessed by a low-reuse process and determining that the file was accessed by a low-reuse process comprises determining that the file was accessed according to an access pattern consistent with the low-reuse process.

14. The system of claim 13, wherein the access pattern comprises: opening the file, then reading sequentially from start to finish without modifying the file, and then closing the file.

15. The system of claim 14, wherein determining that a low-reuse process is executing comprises determining that a global counter is above a given threshold, wherein the prioritization module is configured to:
increment the counter in response to determining that a closed file was accessed according to the pattern; and
decrement the counter in response to determining that the closed file was not accessed according to the pattern.

16. The system of claim 12, wherein decreasing the respective retention priority of the inode comprises assigning the inode a retention priority lower than that of another one of the stored inodes, wherein the inode was accessed more recently than the another one of the inodes.

17. The system of claim 12, wherein the prioritization module is an operating system module or driver.

18. A method comprising:
a computer system storing inodes within an inode cache in a memory of the computer system, wherein the inodes reside in a storage distinct from the memory;
the computer system prioritizing inodes in the cache for replacement according to retention priorities for the inodes; and
in respond to a file close operation, the computer system determining whether the file is unlikely to be reopened, and in response to determining that the file is unlikely to be reopened, decreasing the respective retention priority of one of the inodes, wherein the one of the inodes stores file metadata for the file.

19. The method of claim 18, wherein determining that the file is unlikely to be reopened comprises determining that the file was accessed by a low-reuse process and determining that the file was accessed by a low-reuse process comprises determining that the file was accessed according to an access pattern consistent with the low-reuse process.

20. The system of claim 19, wherein the access pattern comprises: opening the file, then reading sequentially from start to finish without modifying the file, and then closing the file.

* * * * *